United States Patent [19]
White et al.

[11] Patent Number: 5,933,490
[45] Date of Patent: Aug. 3, 1999

[54] OVERLOAD PROTECTION FOR ON-DEMAND ACCESS TO THE INTERNET THAT REDIRECTS CALLS FROM OVERLOADED INTERNET SERVICE PROVIDER (ISP) TO ALTERNATE INTERNET ACCESS PROVIDER

[75] Inventors: Patrick E. White, Vienna; Robert D. Farris, Sterling, both of Va.

[73] Assignee: Bell Atlantic Network Services, Inc., Arlington, Va.

[21] Appl. No.: 08/816,227

[22] Filed: Mar. 12, 1997

[51] Int. Cl.[6] .................................................. H04L 12/00
[52] U.S. Cl. ........................................... 379/221; 395/675
[58] Field of Search ................................... 379/219, 221; 395/672, 674, 675, 200.48

[56] References Cited

U.S. PATENT DOCUMENTS

| | | | |
|---|---|---|---|
| 4,872,160 | 10/1989 | Hemmady et al. | 370/60 |
| 4,958,341 | 9/1990 | Hemmady et al. | 370/60.1 |
| 5,247,571 | 9/1993 | Kay et al. | 379/207 |
| 5,309,437 | 5/1994 | Perlman et al. | 370/85.13 |
| 5,341,374 | 8/1994 | Lewen et al. | 370/85.4 |
| 5,375,068 | 12/1994 | Palmer et al. | 364/514 |
| 5,406,557 | 4/1995 | Baudoin | 370/61 |
| 5,410,754 | 4/1995 | Klotzbach et al. | 370/85.13 |
| 5,430,727 | 7/1995 | Callon | 370/85.13 |
| 5,434,913 | 7/1995 | Tung et al. | 379/202 |
| 5,475,732 | 12/1995 | Pester, III | 379/34 |
| 5,490,247 | 2/1996 | Tung et al. | 395/162 |
| 5,493,568 | 2/1996 | Sampat et al. | 370/60 |
| 5,526,353 | 6/1996 | Henley et al. | 370/60.1 |
| 5,572,583 | 11/1996 | Wheeler, Jr. et al. | 379/207 |
| 5,608,786 | 3/1997 | Gordon | 379/100 |
| 5,724,355 | 3/1998 | Bruno et al. | 370/401 |
| 5,724,412 | 3/1998 | Srinivasan | 379/93.23 |
| 5,726,984 | 3/1998 | Kubler et al. | 370/349 |
| 5,751,706 | 5/1998 | Land et al. | 370/352 |
| 5,761,290 | 6/1998 | Farris et al. | 379/207 |
| 5,809,128 | 9/1998 | McMullin | 379/215 |
| 5,825,560 | 10/1998 | Mcoarram | 379/133 |

OTHER PUBLICATIONS

Margulies, E. "Understanding The Voice Enabled Internet," Aug. 1996, pp. 4–42, 12–1 through 12–3.

Yang, C. "INETPhone: Telephone Services and Servers on Internet," RFC 1789, http://ds.internic.net/rfc/rfc1789.txt, Feb. 12, 1997, pp. 1–6.

*Primary Examiner*—Lance Leonard Barry, Esq.
*Attorney, Agent, or Firm*—McDermott, Will & Emery

[57] ABSTRACT

Overload protection for dial-up access to the Internet uses a hybrid network including the Internet and an intelligent switched telephone network. A first Internet service provider (ISP) connects to the Internet through its server and router interface. This ISP also connects to a switching system in the telephone network; to provide dial-up service to user terminals connected to the telephone network. A service control point (SCP) in the intelligent telephone network monitors predetermined traffic criteria resulting from dial-up attempts to call the ISP. Threshold parameters are set in storage associated with the SCP, and at least certain of the measured criteria are substantially continually compared to one or more of these parameters. When one or more of the parameters is equaled or exceeded, the SCP causes redirection of calls for the first ISP to an Internet interface provided by an alternate access provider. The alternate Internet access provider may or may not provide independent ISP services. The monitoring and redirection is provided on a substantially continuous basis, to dynamically and proactively provide overload protection. The parameters may be dynamically updated based on conditions as determined from the monitoring.

30 Claims, 12 Drawing Sheets

| PARAMETER | THRESHOLD | ACTION | STEP |
|---|---|---|---|
| CALL RATE | EXCEED HIGH THRESHOLD | SET REDIRECT FLAG | S3 |
| | EXCEED COMBINATION THRESH. | RECORD IN TAB A | S5 |
| | BELOW COMBINATION THRESH. | RECORD IN TAB B | S6 |
| BUSY RATE | EXCEED HIGH THRESHOLD | SET REDIRECT FLAG | S8 |
| | EXCEED COMBINATION THRESH. | RECORD IN TAB C | S10 |
| | BELOW COMBINATION THRESH. | RECORD IN TAB D | S11 |
| QUICK DIS-CONNECT RATE | EXCEED HIGH THRESHOLD | SET REDIRECT FLAG | S13 |
| | EXCEED COMBINATION THRESH. | RECORD IN TAB E | S15 |
| | BELOW COMBINATION THRESH. | RECORD IN TAB F | S16 |
| CALL WAIT | EXCEED HIGH THRESHOLD | SET REDIRECT FLAG | S18 |
| | EXCEED COMBINATION THRESH. | RECORD IN TAB G | S20 |
| | BELOW COMBINATION THRESH. | RECORD IN TAB H | S21 |
| CALL DURATION | EXCEEDS THRESHOLD | RECORD IN TAB I | S23 |
| ALGORITHM | A+C | SET REDIRECT FLAG | S25 |
| | A+E | SET REDIRECT FLAG | S27 |
| | C+G | SET REDIRECT FLAG | S29 |
| | A+I | SET REDIRECT FLAG | S31 |
| | A+C+E | SET REDIRECT FLAG | S33 |
| | C+E+G. | SET REDIRECT FLAG | S35 |

Figure 10

OVERLOAD PROTECTION FOR ON-DEMAND ACCESS TO THE INTERNET THAT REDIRECTS CALLS FROM OVERLOADED INTERNET SERVICE PROVIDER (ISP) TO ALTERNATE INTERNET ACCESS PROVIDER

FIELD OF THE INVENTION

This invention relates to access to a public packet switched data network such as the Internet and more particularly to engineered access which alleviates if not eliminates overload at access gateways.

RELATED APPLICATIONS

This application is related to pending U.S. application Ser. No. 08/768,460, filed Dec. 18, 1996, entitled Internet Long Distance Telephone Service, and U.S. Ser. No. 08/816,229, filed Mar. 12, 1997, entitled Public IP Transport Network. Both applications are assigned to the assignee of the instant application and are incorporated in their entirety herein by reference.

Acronyms

The written description uses a large number of acronyms to refer to various services and system components. Although generally known, use of several of these acronyms is not strictly standardized in the art. For purposes of this discussion, acronyms therefore will be defined as follows:

Advanced Intelligent Network (AIN)
Autonomous Systems (AS)
Call Processing Record (CPR)
Common Channel Inter-office Signaling (CCIS)
Data and Reporting System (DRS)
Dual Tone Multifrequency (DTMF)
Information Providers (IPs)
Integrated Service Control Point (ISCP)
Intelligent Peripheral (IP)
Internet Protocol Routing Service (IPRS)
Internet Service Providers (ISPs)
Local Area Networks (LANs)
Local Exchange Carrier (LEC)
Multi-Services Application Platform (MSAP)
Personal Computers (PCs)
Personal Communications Service (PCS)
Personal Identification Number (PIN)
Plain Old Telephone Service (POTS)
Point In Call (PIC)
Point of Presence (POP)
Public Switched Telephone Network (PSTN)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Telephone Company (TELCO)
Transaction Capabilities Applications Protocol (TCAP)
Transmission Control Protocol/Internet Protocol (TCP/IP)

BACKGROUND ART

The most widely used public data network in the United States and the world at large is the network commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as Transmission Control Protocol/Internet Protocol (TCP/IP). The protocols generally referred to as TCP/IP were originally developed for use only through Arpanet and have subsequently become widely used in the industry. TCP/IP is flexible and robust; in effect, TCP takes care of the integrity and IP moves the data. Internet provides two broad types of services: connectionless packet delivery service and reliable stream transport service.

The Internet basically comprises several large computer networks joined together over high-speed data links ranging from ISDN to T1, T3, FDDI, SONET, SMDS, OC1, etc. The most prominent of these national nets are MILNET (Military Network), NSFNET (National Science Foundation NETwork), and CREN (Corporation for Research and Educational Networking). The U.S. government's 1991 decision to end subsidizing the NSFNET backbone beginning in 1995 resulted in massive restructuring directed to shaping the Internet into a productive tool for business. In 1995, the Government Accounting Office (GAO) reported that the Internet linked 59,000 networks, 2.2 million computers and 15 million users in 92 countries. It is presently estimated that the growth of the Internet is at a more or less annual doubling rate.

Generally speaking the Internet consists of Autonomous Systems (AS) which may be owned and operated by Internet Service Providers (ISPs) such as PSI, UUNET, MCI, SPRINT, etc. The Autonomous Systems (ASs) are linked by Inter-AS Connections. Information Providers (IPs), such as America Online (AOL) and Compuserve, are connected to the Internet via high speed lines, such as T1/T3 and the like, and generally do not have their own Internet based Autonomous Systems but have or use Dial-Up Networks such as SprintNet (X.25), DATAPAC and TYMNET. By way of current illustration MCI is both an ISP and an IP, Sprint is an ISP, and MicroSoft (MSN) is an IP using UUNET as an ISP. Other information providers, such as universities, are connected to the AS/ISPs via the same type connections. Corporate Local Area Networks (LANs) are connected through routers and links such as T1 lines. Personal computers (PCs) and Laptop computers are representative of computers connected to the Internet via the public switched telephone network (PSTN) and AS/ISPs via dial up links.

The Information Providers (IPs) constitute the end systems which collect and market the information through their own servers. Access providers are companies such as UUNET, PSI, MCI and SPRINT which transport the information. Such companies market the usage of their networks.

Commercial ISPs may range in size from commonly called "mom and pop operations" to national entities offering connectivity services nationwide or internationally in some instances. An increasing number of such national ISPs have begun to offer proprietary services in addition to simple Internet access. Examples of these ISPs are presently America on Line (AOL), CompuServe, and Prodigy. FIG. 1 shows a typical architecture of such an Internet Service Provider (ISP) which offers proprietary content services.

Aggressive competition by regional ISPs has recently induced a number of the larger national ISPs to offer flat-rate pricing coupled with intensive advertising. This has been received with enthusiasm with the result that leading systems are frequently overloaded. More and more users are buying computers which are sufficiently powerful to send video and photographs, which constitute data-intensive material that can clog lines. In addition, more and more companies are using the Internet to conduct their business, communicate with and support their customers, exchange electronic mail with hundreds of thousands of users, seek and find valuable information. The most common forms of the overload are twofold. Customers frequently encounter busy signals due to lack of line capacity following the dialing of a hunt-group type directory number. This produces a complete inability for the customer to connect to the ISP. Secondly, there is frequent overload in one or more of the modem pool, host or server, and/or router of the ISP. These types of overload result in both inability to reach the ISP server, as well as sluggish operation of the system with frequent and sometimes extensive delays after the customer is on-line.

One approach to the overload problem has been proposed in U.S. application Ser. No. 08/816,229 cited above, and assigned to the assignee of the instant application. According to that proposal the capabilities of an Advanced Intelligent Network (AIN) associated with a transporting telephone company (TELCO) are utilized to effect simultaneous multiple line redirection in accord with predetermined conditions established by the ISP. By way of example, the ISP may know that load peaks at known times of day and days of the week. The ISP accordingly pre-designates a series of lines in one or more hunt groups to be redirected to additional lines, servers and routers automatically when the pre-determined conditions exist. In this manner incoming calls during the peak hours are handled by automatically increasing the number of lines, servers, and routers to which those calls are directed. The additional lines, servers, and routers may direct the calls through facilities of the telephone company or of a competitive ISP. Although this solution entails the additional expense of at least temporarily using TELCO or a competitor's facilities, it provides the expanding ISP the significant advantage of permitting it to continue to acquire customers as it enlarges its own facilities, if it so chooses.

While the foregoing innovation provides a significant step towards facilitating the handling of ever-increasing Internet traffic, it does not address the problem presented by unforeseeable rapid increases in load as they may dynamically occur.

DISCLOSURE OF THE INVENTION

Objectives of the Invention

It is a primary object of the present invention to provide a system and method for meeting the above-described need and solving the problem which it presents.

It is another object of the invention to meet this need using plant, facilities and technologies which are individually available to a large extent in the public switched telephone network (PSTN).

It is further object of the invention to provide alternate Internet traffic transport and processing on a dynamically automatic basis.

It is a still further object of the invention to provide to an Internet Service Provider a dynamic load redirection service to avoid or control network overload.

It is yet another object of the invention to provide such service utilizing a public switched telephone network (PSTN) having an Advanced Intelligent Network (AIN) and common channel interoffice signaling (CCIS) system.

SUMMARY OF THE INVENTION

The present invention provides a system and method whereby a public telephone network having an Advanced Intelligent Network (AIN) and a common channel signaling (CCIS) system provides plant and service for automatically and dynamically redirecting calls to a provider of access to an internetwork of computer networks such as the Internet. The invention makes innovative use of the triggering capabilities and call processing functions of the advanced intelligent network (AIN), to provide a flexible arrangement to react to the load being delivered to such an access provider whereby incoming calls are redirected to alternate lines made available to dynamically meet the demand and prevent or control overload situations.

Triggering in such a network causes a program-controlled switch to initiate a query to a remote database, in an ISCP, SCP or the like. The database responds with information for controlling further processing of the call by the switch and/or other network elements such as so called Intelligent Peripherals or IPs.

According to the present invention, such triggers are used to enable the ISCP to mediate the redirection of calls pursuant to predetermined dynamically occurring conditions. By way of example, ISPs providing Internet access to the general public normally use dial-up numbers which represent a hunt group of lines. Each of the hunt group lines has its own number which is unknown to the caller. In this example an originating trigger is set in each end office for the dial-up number of the ISCP which connects to the hunt group. When the ISP number is dialed by a caller the originating trigger is actuated, the call is suspended, and the triggered end office launches a TCAP query to the ISCP. The ISCP is thus notified of each call to the ISP. According to the invention the ISCP or an associated IP is provided with a CPR that programs the ISCP and/or the IP to collect the following information and perform the following steps (among others) with respect to calls to the ISP:

1. Maintain a record of connect and disconnect events for the lines in the ISP hunt group and date and time stamp each event.
2. Maintain a record of the connected and disconnected status of each line in the hunt group.
3. Record unavailability of called dial-up number (all lines in hunt group busy) and date and time stamp commencement and cessation of unavailable condition.
4. Record time and date of connection of each calling party.
5. Record time of disconnection.
6. Compile record of rate of calls.
7. Compile record of average duration of calls.
8. Compile record of rate of occurrence of calls with a connect-disconnect duration less than a pre-designated minimum.
9. Compile record of rate of unavailability of dial-up number.
10. Maintain record of calls in progress and percentage of available hunt group lines in use.
11. Store and run processing program provided by ISP customer.

The processing program provided by the ISP specifies line redirection based on dynamically compiled data which is stored in the ISCP and/or an intelligent peripheral or IP. This program is prepared using conventional predictive algorithms such as Poisson tables and the like. Upon the occurrence of one or a combination of specified action conditions the ISCP directs redirection of specified calls to alternate lines and facilities. Such lines may be obtained from any available source, usually the local exchange carrier (LEC) which provides the dial-up facilities and has an AIN network which can readily perform the above described functions. Following call redirection the ISCP/IP continues to monitor the specified parameters. The process and program supplied by the ISP customer may also direct that under certain conditions, such as load falling below the specified threshold or thresholds, the redirection is to be reversed and calls directed in the original manner.

It is a feature of the invention that the AIN directed common channel interoffice signaling (CCIS) system used in the invention may provide forwarding of calls on an individual basis without returning a busy signal to the caller. Thus the caller is presented with the desired appearance of having uninterrupted and substantially delay free dial-up access to the Internet. If the originating trigger query message ascertains from the ISCP that there is no line available for the called number at the destination end office, it may return a TCAP signal to the originating end office to forward the call to a hunt group number provided as the alternate route. Alternatively, common channel signaling may provide the determination of the availability of the called line and this signal may be used to actuate call forwarding, if such is the action called for in the program provided by the ISP for handling its alternate routing by the TELCO.

It is a further feature of the invention that alternate handling of calls may be provided in the case where overloading or failures are occurring in the equipment of the ISP. Such conditions may constitute breakdown of line modems or other ISP equipment or overload of the ISP equipment. In such situations the calling party may effect a dial-up connection to the facility of the ISP but then encounter difficulty. Usually this leads to a quick disconnect, an event that can be monitored by the ISCP. Upon sensing the occurrence of a threshold rate of short disconnects, the calls to the designated number are redirected to the alternate facility.

Still another facet of the invention is the ability to provide re-routed callers with alternate access to the facilities of the ISP. As previously indicated, many ISPs provide proprietary services which may or may not entail access to the Internet. The invention provides access to such ISP services by enabling the re-routed ISP customers to access the software site of the ISP through the Internet. Certain ISP customers may desire such access because they prefer the software and user interface of the ISP to the software and user interface utilized in the facility provided by the alternate route provider. Once connected to the site of the ISP, the ISP customer may use the interface to access the proprietary non-Internet service. The user may further use that interface to access the Internet, if he or she so desires.

In providing this particular service the alternate route provider may utilize an initial user interface that includes an inquiry as to whether or not the user desires to access the ISP site. If the user interactively indicates such a desire, the alternate server may run a program to automatically effect connection to the ISP site through the Internet. Alternately, the alternate server may invite the user to manually proceed through the steps of using the Interface to effect such a connection.

BRIEF DESCRIPTION OF DRAWINGS

FIG. 10 shows in tabular form the details of the steps performed according to the flow chart of FIGS. 9A to 9C.

BEST MODE FOR CARRYING OUT THE INVENTION

The present invention provides an arrangement in a public telephone network offering intelligent services for automatically and dynamically redirecting calls to a provider of access to an internetwork of computer networks such as the Internet. The present invention takes advantage of the call processing and intelligence gathering functions of an intelligent network, also referred to as an advanced intelligent network (AIN), to provide a flexible arrangement to react to the load being delivered to an Internet access provider. Through the methodology of the invention functionality may be provided to redirect incoming calls to alternate lines made available to meet the demand and prevent or control overload situations. A brief description will be provided of the AIN implementing the line redirecting and overload prevention functions of the present invention, followed by a description of the monitoring operations and redirection functions as implemented in the disclosed AIN.

Figure 2:
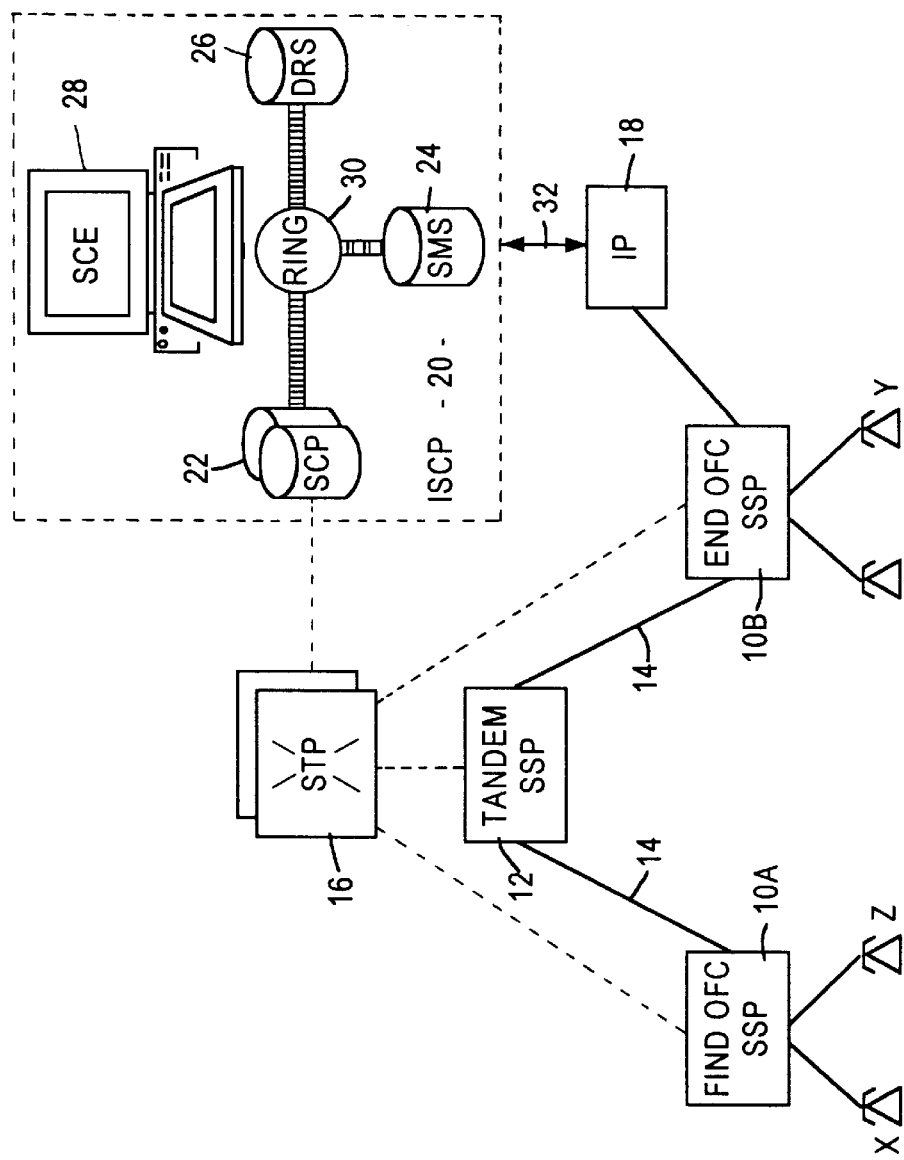
FIG. 2 is a block diagram illustrating an advanced intelligent network using the queuing arrangement according to a preferred embodiment of the present invention.

FIG. 2 provides a simplified block diagram of a public telephone type communications network having program-controlled nodes to provide advanced intelligent network service capabilities. The network shown in FIG. 2 is similar to that shown in U.S. Pat. No. 5,247,571 to Kay et al., the disclosure of which is incorporated in its entirety by reference. The program-controlled nodes are referred to as "AIN nodes" or "AIN elements". The telephone network of FIG. 2 includes a switched traffic network and a common channel signaling network used to carry control signaling and the like between nodes of the switched traffic network.

The network of FIG. 2 includes a number of end office switching systems 10, also referred to as service switching points (SSPs) for reasons discussed later herein. The end office switching systems 10A and 10B provide connections to and from local communication lines (local loops) coupled to end users terminals or equipment.

The end offices 10 are typically connected into a local exchange carrier (LEC) network, typically including one or more tandem switching offices 12 providing trunk connections between end offices. As such, the local exchange carrier network comprises a series of switching offices 10 interconnected by voice grade trunks 14. As known in the art, one or more trunks will typically connect one or more switching offices to at least one switch in other carrier networks (not shown).

Each switching office 10 has at least minimal SS7 signaling capability, which is conventionally referred to as a signaling point (SP) in reference to the SS7 network. In the local exchange network, at least one of the switching offices 10, and preferably all, are programmed to recognize identified events or points in call (PICs). In response to a PIC, the switching office 10 triggers a Transaction Capabilities Applications Protocol (TCAP) query message through the signaling network to an Integrated Service Control Point (ISCP) 20 for instructions relating to AIN type services. Switching offices having the full PIC recognition and signaling capabilities are referred to as service switching points (SSPs).

The ISCP 20 offers AIN routing control functionalities to customers of the local exchange carrier. For example, the ISCP includes an SCP database 22 containing customer profile records (CPRs) for controlling call processing in response to respective triggers. The ISCP 20 may also access a separate database, for example, to supplement its routing tables for certain services. In the preferred system, a second function of the ISCP is to serve as a mediation point. Specifically, the ISCP 20 mediates queries and responses between the local exchange carrier network components and databases operated by other carriers.

The ISCP 20 is an integrated system, and includes a Service Management System (SMS) 24, a Data and Reporting System (DRS) 26, and the database referred to as a Service Control Point (SCP) 22. The ISCP also typically includes a terminal subsystem referred to as a Service Creation Environment or SCE 28 for programming the database in the SCP for the services subscribed to by each individual business customer. The components of the ISCP are connected by an internal, high-speed data network, such as a token ring network 30.

The switches 10 typically comprise programmable digital switches with common channel interoffice signaling (CCIS) communications capabilities. One example of such a switch is a 5ESS type switch manufactured by AT&T, although other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Figure 4:
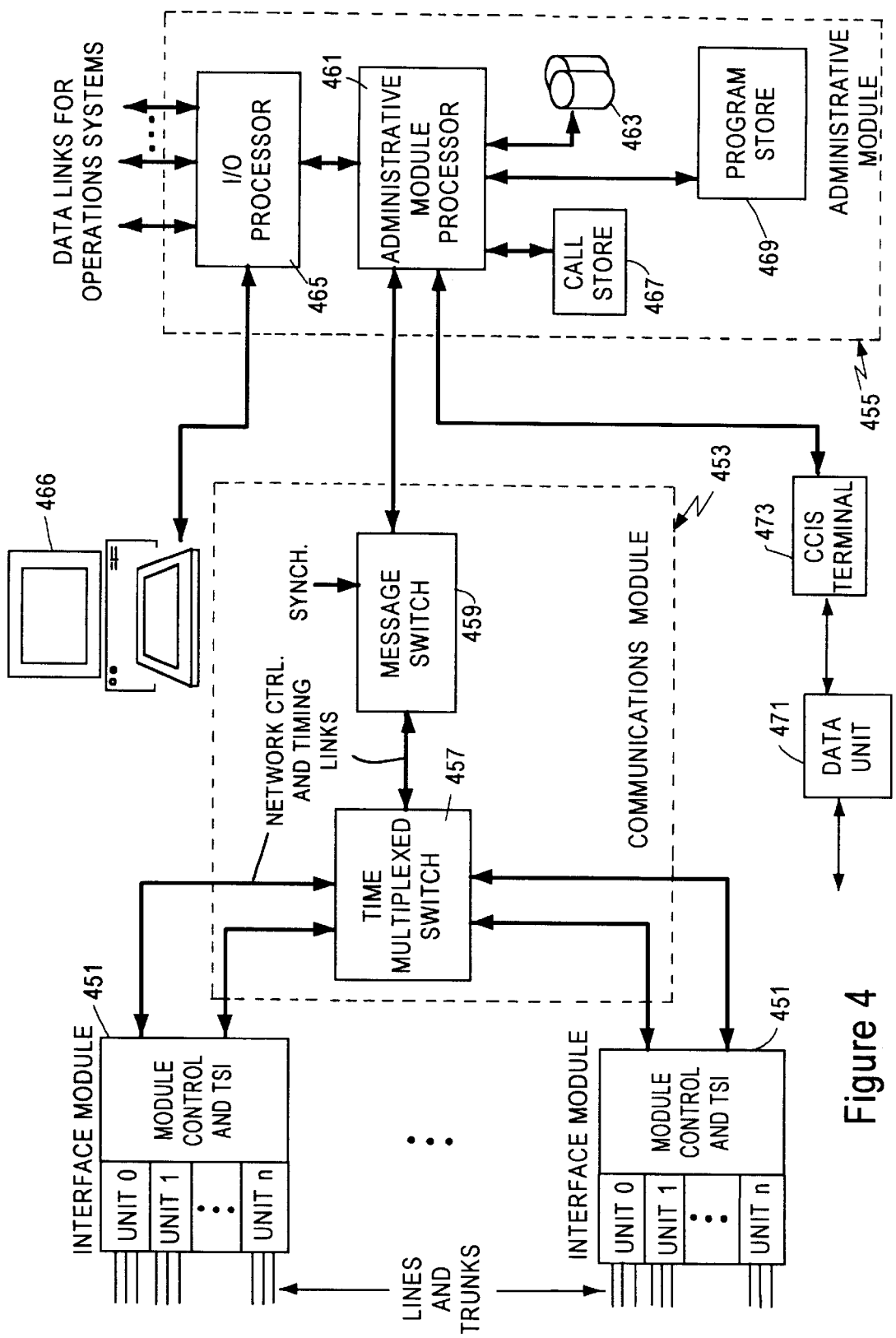
FIG. 4 is a simplified block diagram of an electronic program controlled switch which may be used as any one of the SSP type CO's in the system of FIG. 2.

FIG. 4 is a simplified block diagram of an electronic program controlled switch which may be used as any one of the SSP type CO's in the system of FIG. 2. As illustrated, the CO switch includes a number of different types of modules. In particular, the illustrated switch includes interface modules 451 (only two of which are shown), a communications module 453, and an administrative module 455.

The interface modules 451 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 451 also includes a digital service unit (not shown) which is used to generate call progress tones.

Each interface module 451 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 457 and thence to another interface module (intermodule call connection).

The communication module 453 includes the time multiplexed switch 457 and a message switch 459. The time multiplexed switch 457 provides time division transfer of digital voice data packets between voice channels of the interface modules 451 and transfers data messages between the interface modules. The message switch 459 interfaces the administrative module 455 to the time multiplexed switch 457, so as to provide a route through the time multiplexed switch permitting two-way transfer of control related messages between the interface modules 451 and the administrative module 455. In addition, the message switch 459 terminates special data links, for example a link for receiving a synchronization carrier used to maintain digital synchronism.

The administrative module 455 includes an administrative module processor 461, which is a computer equipped with disc storage 463, for overall control of CO operations. The administrative module processor 461 communicates with the interface modules 451 through the communication module 455. The administrative module 455 also includes one or more input/output (I/O) processors 465 providing interfaces to terminal devices for technicians such as shown at 466 in the drawing and data links to operations systems for traffic, billing, maintenance data, etc. A CCIS terminal 473 and an associated data unit 471 provide a signaling link between the administrative module processor 461 and an SS7 network connection to an STP or the like (see FIG. 2), for facilitating call processing signal communications with other COs and with the ISCP 440.

As illustrated in FIG. 4, the administrative module 455 also includes a call store 467 and a program store 469. Although shown as separate elements for convenience, these are typically implemented as memory elements within the computer serving as the administrative module processor 461. For each call in progress, the call store 467 stores translation information retrieved from disc storage 463 together with routing information and any temporary information needed for processing the call. For example, for a switch based Centrex type service, the call store 467 would receive and store extension number translation information for the business customer corresponding to an off-hook line initiating a call. The program store 469 stores program instructions which direct operations of the computer serving as the administrative module processor.

Referring to FIG. 2, within the local exchange network, the CCIS network includes one or more Signaling Transfer Points (STPs) 16 and data links shown as dotted lines between the STP 16 and the switching offices 10. Typically, STPs 16 are implemented as matching or mated pairs, to provide a high level of redundancy. A full description of such paired STPs is found in Eugene M. Pester III U.S. Pat. No. 5,475,732, issued Dec. 12, 1995, entitled Common Channel Signaling Network Maintenance and Testing. A data link also connects each of the STPs of pair 16 to the ISCP 20. One or more data links also connect the STPs 16 in the local exchange carrier network to mated pairs of STPs in networks of a second carrier (not shown).

The local exchange carrier network may also include one or more intelligent peripherals (IPs) 18. The IP 18 provides enhanced announcement, digit collection, speech recognition, and/or other capabilities as later described. The IP 18 connects to the switch 10 of the local exchange carrier network via an appropriate line circuit capable of carrying both voice and data. The IP 18 also communicates with the ISCP 20 through a data communication network 32 separate from the telephone company switching offices and associated interoffice signaling network. The data communication network 32 is preferably a packet switched network that serves as a signaling network enabling communications between AIN elements including the IP and the ISCP. The network 32 transports messages using a standardized transport protocol, such as TCP/IP, or a generic data interface (GDI), and may be implemented using X.25, frame relay, SMDS, or ATM technologies.

Figure 5:
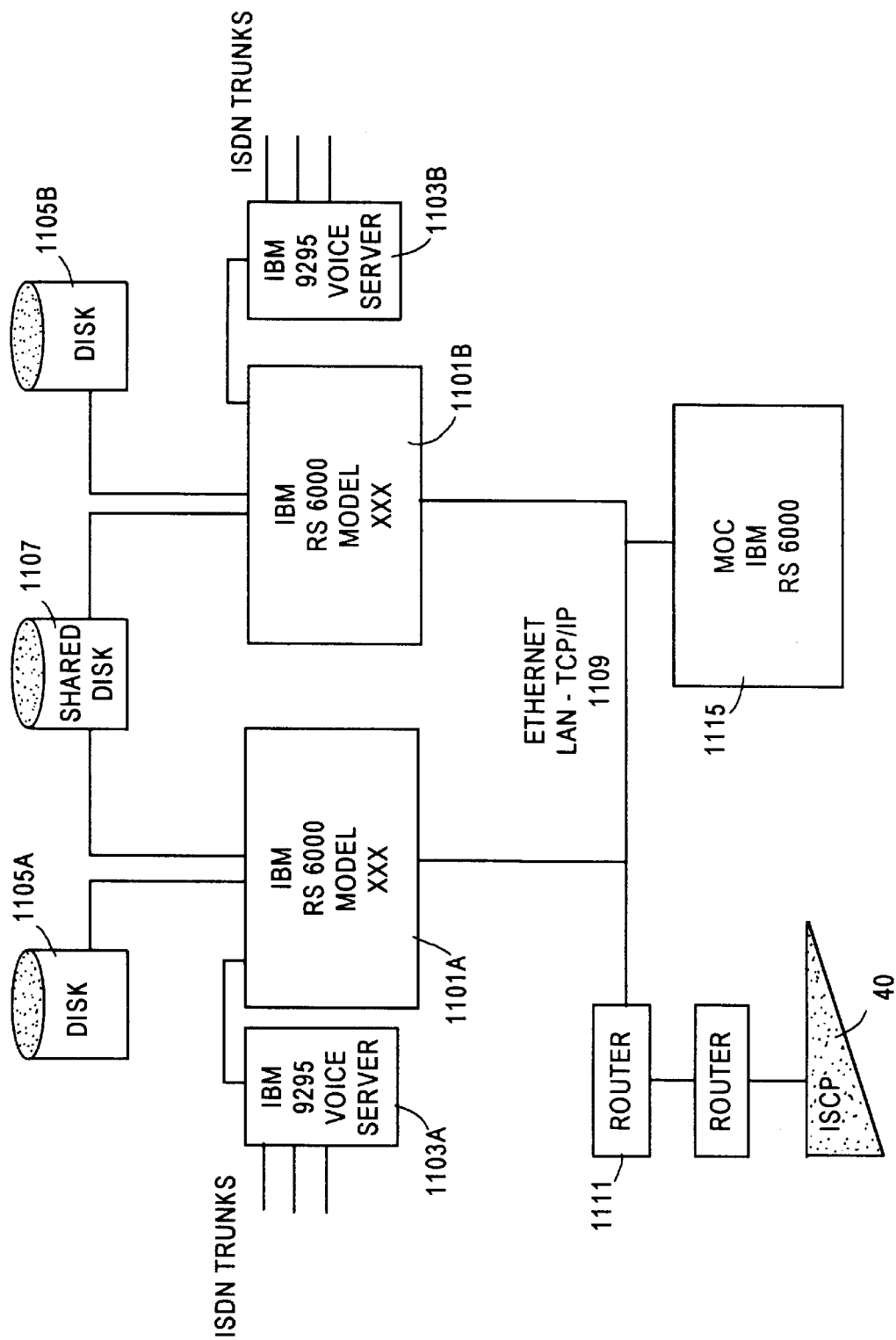
FIG. 5 illustrates a first, preferred embodiment of the IP used in the network of FIG. 2.

FIG. 5 illustrates a first, preferred embodiment of the IP used in the network of FIG. 2. In this implementation, the IP will consist of two or more general purpose computers 1101A, 1101B, such as IBM RS-6000's. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 1107. Each computer will also include an interface card for providing two-way communications over an internal data communications system, an Ethernet type local area network 1109. The Ethernet carries communications between the individual computers and between the computers and a router which provides an interconnection to the second signaling communications network going to the ISCP. The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 1101A, 1101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 6:
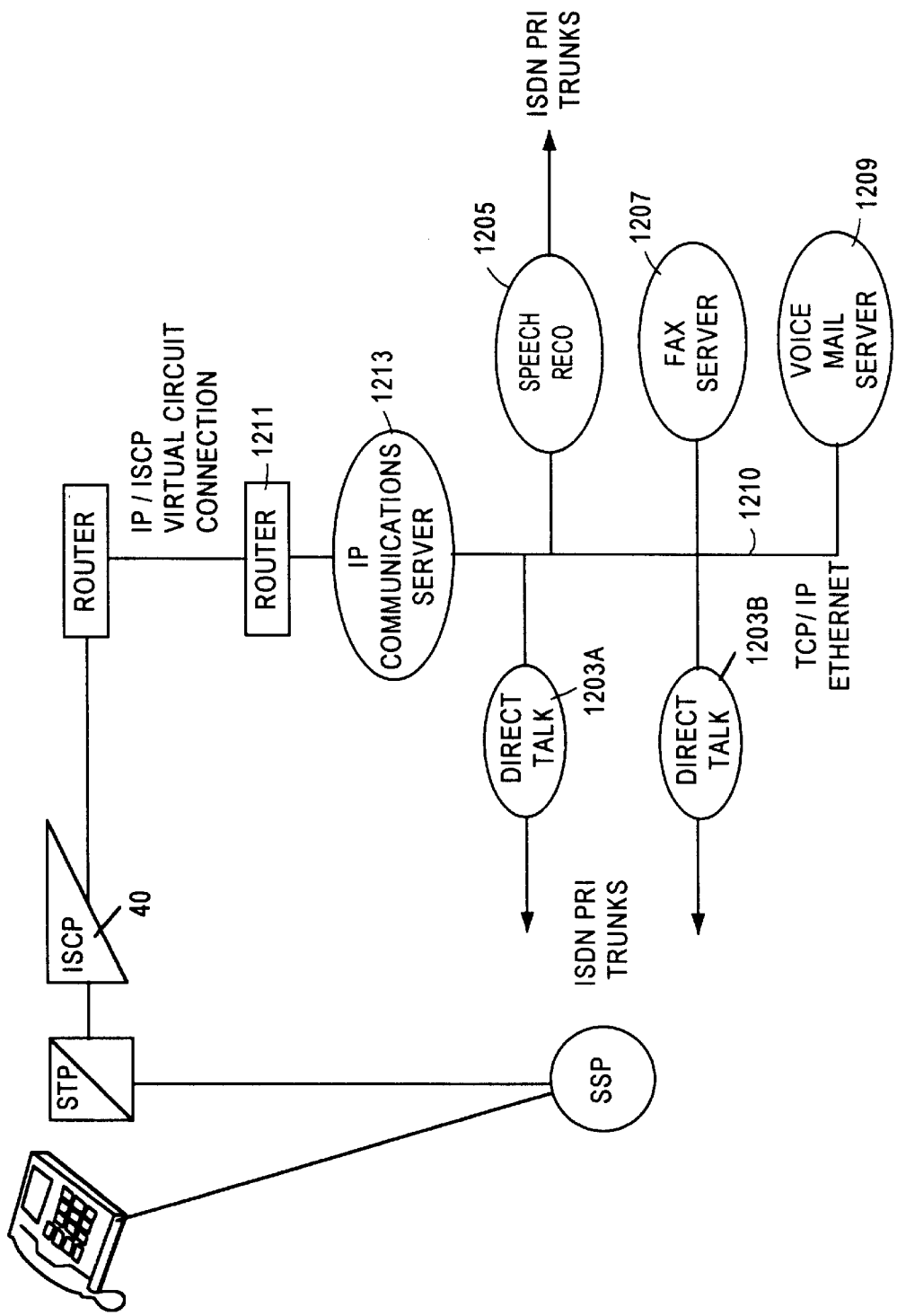
FIG. 6 illustrates an alternate embodiment of an IP which may be used in the network of FIG. 2.

FIG. 6 illustrates an alternate embodiment of an IP which may be used in the network of FIG. 2. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, etc. The various modules communicate with one another via an data communication system 1210, which again may be an Ethernet type local area network.

The Direct Talk modules 1203A, 1203B provide voice message transmission and dialed digit collection capabilities, as in the earlier embodiment. The modules 1203A, 1203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signaling communication system and the ISCP 40 and other IPs which connect to that signaling communication system. The communication server 1213 controls communications between the modules within the IP and the second signaling communication system.

In each of the proposed architectures, the SSP switch would route calls to the different elements of the IP in response to instructions from the ISCP. In the initial implementation using general purpose computers (FIG. 5), each of which offers all service functionalities, the decision to route to a particular one of the computers would be a resource availability/allocation decision. If necessary data can be exchanged between the computers via the internal data communications network, e.g., if a message for a particular subscriber's service is stored in the disc memory associated with one computer but the other computer is actually processing the call. In the second implementation (FIG. 6), however, the ISCP would instruct the SSP to route the call to the particular line to the specific module capable of providing a calling customer's individual service. For example, if the subscriber has some form of speech recognition service, the call would be routed to the speech recognition module 1205. If the subscriber has a voice mail service, however, the ISCP would instruct the SSP to route the call to one of the lines going to one of the voice server modules 1203A, 1203B. The module 1203A, or 1203B would receive outgoing voice messages from the voice mail server 1209 for transmission to the caller. The module 1203A or 1203B would decode DTMF signals and supply appropriate data to the voice mail server, for control purposes. The module 1203A or 1203B would also format incoming voice messages for transmission over internal network 1210 and storage by server 1209.

According to one preferred embodiment of the invention the IPs may communicate with the ISCP using a proprietary protocol +1129 developed for the project described in U.S. Pat. No. 5,572,583, issued Nov. 5, 1996, to Wheeler and Farris, entitled Advanced Intelligent Network With Intelligent Peripherals Interfaced to the Integrated Services Control Point, and assigned to the assignee of the instant application, the IP will query ISCP in response to a call. As will be described in further detail, during a call a trigger event occurs. The SSP thereupon queries the ISCP. The ISCP responds by instructing the SSP to route the call to the IP, using standard TCAP protocol messages. Substantially simultaneously the ISCP uses the +1129 protocol on the second signaling network to send to the IP, one or a sequence of instructions as to how to process the particular call which is sent by the SSP. The message set defined by this protocol is as follows:

ProvideInstructions—message sent by the IP to ask ISCP software for information on handling a call. Begins a transaction and provides necessary information to start the appropriate MSAP script.

CallInfoToResource—sent by ISCP software to the IP to inform it to play messages to the caller and/or collect and return digits entered by the caller. May inform the IP to terminate the call.

CallInfoFromResource—message sent by the IP in response to the preceding

CallInfoToResource—message. Includes result code and collected digits.

SwitchInfoToResource—message sent by ISCP software to provide the IP with the information it needs to transfer the call elsewhere. This message and the following one are not part of TA-NWT-001129.

SwitchInfoFromResource—message sent by the IP or ISCP software with the result of the preceding SwitchInfoToResource.

ResourceClear—message may be sent by the IP in response to a preceding CallInfoToResource if that preceding message requested that the call be terminated. Also, may be sent by the IP asynchronously to alert ISCP software that the call was terminated by the customer. This message includes a parameter describing the "cause" for terminating the call.

CancelResourceEvent—message sent asynchronously by ISCP software to terminate the conversation. Implies abnormal termination. Normally CallInfoToResource is used to terminate a call.

ExtendedInfoToResource—message sent by ISCP software to the IP to provide a standard format for extending the message set above. In this specification, it is used to extend the message set to include the Play Application with information message.

ExtendedFromToResource—message sent by the IP to ISCP software in response to the in response to the ExtendedInfoToResource message above.

A modified protocol specified in Bellcore TA-NWT-001129 includes a similar but somewhat smaller message set which may be used for communications between an ISCP and an SSP as an enhancement over the standard TCAP message set.

As an alternative or in addition to the +1129 protocol, communications between the IP and the ISCP may utilize generic data interface (GDI). The GDI command set is simpler and more generic, and the commands can carry more data. Also, the ISCP can initiate communications using GDI. This permits a wider variety of routing and processing routines. In response to a triggering event, the SSP would again receive instructions to route a call in progress to the IP. However, rather than waiting for a subsequent query from the IP, while the SSP is routing the call the ISCP may instruct the IP to prepare to receive a call on a particular circuit and may forward additional call specific information. For example, for a call which might require speech recognition processing, the ISCP would instruct the IP to retrieve appropriate recognition templates from memory. Other protocols could be used to permit either the ISCP or the IP to initiate communications.

Referring to FIG. 2, the end office switching system 10 normally responds to a service request on a local communication line connected thereto, for example an off-hook from station X followed by dialed digit information, to selectively connect the requesting line to another selected local communication line, for example to the line to station Z. The connection can be made locally through only the connected end office switching system 10A but typically will go through a number of switching systems.

In the normal call processing, the central office switching system 10 responds to an off-hook and receives dialed digits from the calling station. The central office switching system analyzes the received digits to determine if the call is local or not. If the called station is local and the call can be completed through the one central office (intraoffice call), e.g., from calling station X to called station Z via the central office 10A, the central office switching system connects the calling station to the called station. If, however, the called station is not local, e.g., from calling station Y to called station Z, the call must be completed through one or more distant central offices (interoffice call), and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 20, the end offices and/or tandems are SSP capable and detect one of a number of call processing events, each identified as a 'point in call' (PIC), to trigger AIN type processing. Specifically, in response to such a PIC, a switching system such as switch 10 suspends call processing, compiles a call data message, also referred to as a TCAP query message, and forwards that message via common channel interoffice signaling (CCIS) links and one or more STPs 16 to an ISCP 20. If needed, the ISCP 20 can instruct the particular switching office to obtain and forward additional information. Once sufficient information has reached the ISCP 20, the ISCP 20 accesses its stored data tables and or data in external databases to translate the received data into a call control message and returns the call control message to the switching office via the STP 16 and the appropriate CCIS links. The switching office 10 uses the call control message to complete the particular call through the public switched network in the manner specified by the subscriber's data file in the ISCP 20.

In a mediated call processing operation, a switch such as SSP switch 10 reaches a point in call (PIC) in processing a particular call which triggers AIN type processing. A variety of triggers are known including the full range of AIN triggers, such as off-hook, off-hook delay, private dialing plan, virtual numbers (e.g. 500, 800, 900), terminating attempt, etc. In response to the PIC trigger, the switch 10 launches a TCAP query through the STP 16 to the ISCP 20. The ISCP 20 accesses the relevant call processing record (CPR) for the subscriber.

The SCP 22 will contain a call processing record (CPR) for providing the subscriber a customized service on the particular type of call. The subscriber has previously communicated how certain calls should be processed, and the network's personnel will have established the appropriate CPR in the SCP 22.

The SCP 22 accesses the CPR to determine how to process the particular call and returns an appropriate instruction to the ISCP 20. The ISCP 20 in turn performs a mediation function. The ISCP 20 formulates an appropriate TCAP response message, and transmits that message through SS7 links and one or more STPs 16 to the switch 10 and the switch processes the call accordingly.

Figure 3:
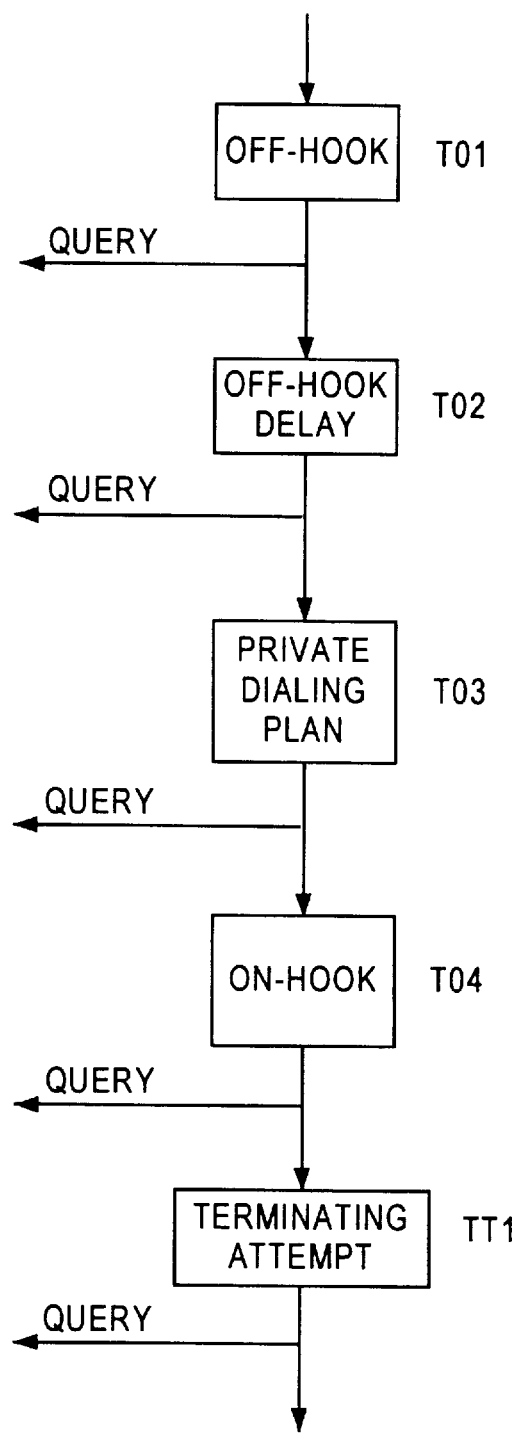
FIG. 3 is a diagram illustrating triggers that may be set in one of the service switching points of FIG. 2.

To further understand the access to trigger functionality, it will be helpful first to consider the relationship between various trigger events. FIG. 3 provides a logical illustration of the relationship between a number of different triggers that may be encountered on any given call. A number of triggers may be set in an originating office, such as an off-hook trigger TO1, an off-hook delay trigger TO2, an individualized dialing plan trigger TO3, and an on-hook or disconnect trigger TO4. Such triggers are set by defining a point in call (PIC) in the subscriber profile for the calling party's line in the switching office serving that line. An off-hook PIC triggers a query immediately whenever a user takes a station off-hook. An off-hook delay PIC triggers a query whenever a station goes off-hook, however, the switch launches the query after collecting dialed digits. An individualized dialing plan PIC triggers a query if a user dials a predetermined or 'plan' number. An on-hook, or disconnect, PIC is the converse of the off-hook PIC, and triggers a query whenever the station goes on-hook.

As shown by FIG. 3, the triggers have a logical hierarchical relationship. If an off-hook trigger or an off-hook delay trigger is set against a particular line, then the switch launches the query every time that a station on that line goes off-hook. The response to that query controls subsequent processing of the call. By contrast, an individualized dialing plan trigger controls call processing only if the caller dials a particular number, assuming that there was no off-hook trigger already set.

Other triggers are set in the terminating office, such as the terminating attempt trigger TT1. Such triggers are set by defining a point in call (PIC) in the subscriber profile for the called party in the serving switching office, as identified by that party's telephone number. An outgoing call may produce a trigger in the originating switching office which results in AIN processing based on the caller's customized service. When the call reaches the terminating office, the call may trigger processing based on the called party's customized service.

The types of AIN triggers discussed above are exemplary only. A variety of additional triggers are known. Examples of known AIN triggers include: off-hook immediate, off-hook delay, trunk seizure, primary rate interface, individualized dialing plan, office dialing plan, transit network selection, originating line information, directory number, automatic route selection, automatic alternate routing, basic rate interface feature button, terminating attempt, disconnect, virtual numbers, and others.

All such triggers cause a program controlled switch to initiate a query to a remote database, in an ISCP, SCP or the like. The database responds with information for controlling further processing of the call by the switch and/or other network elements such as so called intelligent peripherals (IPs). According to the present invention, such triggers are used to enable the ISCP to mediate the redirection of calls pursuant to predetermined dynamically occurring conditions. The invention finds an important application in connection with the provision of access to the Internet.

ISPs providing Internet access to the general public normally use dial-up numbers which represent a hunt group of lines. Each of the hunt group lines has its own number which is unknown to the caller. In this example an originating trigger is set in each end office for the dial-up number of the ISCP which connects to the hunt group. When the ISP number is dialed by a caller the originating trigger is actuated, the call is suspended, and the triggered end office launches a TCAP query to the ISCP. The ISCP is thus notified of each call to the ISP. According to the invention the ISCP, which preferably operates in conjunction with an intelligent peripheral platform or IP, is provided with an ISP customer specification that programs the ISCP and/or the IP to collect designated information and perform specific steps.

The processing program provided by the ISP specifies line redirection based on the ISCP/IP dynamically compiled data using conventional predictive algorithms such as Poisson tables and the like. Upon the occurrence of one or a combination of specified action conditions the ISCP signals redirection of specified calls to alternate lines and facilities. Such lines may be obtained from any available source, usually the local exchange carrier (LEC) which provides the dial-up facilities and has an AIN network which can readily perform the above described functions. Following call redirection the ISCP/IP continues to monitor the specified parameters. The process and program supplied by the ISP customer may also direct that under certain conditions, such as load falling below the specified threshold or thresholds, the redirection is to be reversed and calls directed in the original manner.

Figure 7:
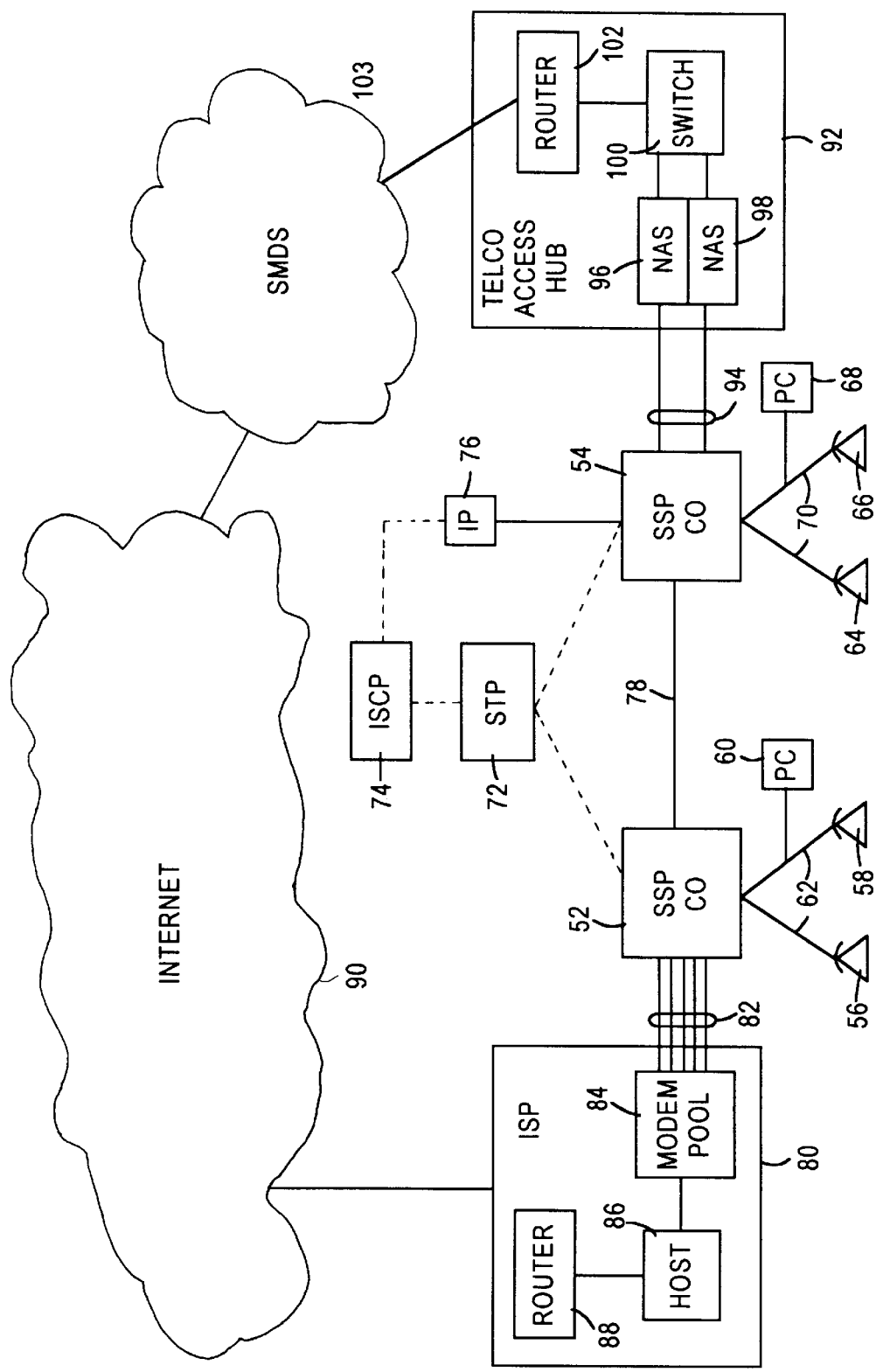
FIG. 7 illustrates diagrammatically a public switched telephone network (PSTN) in the architecture of a system for implementing the invention.

Referring to FIG. 7 there is shown at 50 a public switched telephone network (PSTN) illustratively represented by a pair of central office switching systems 52 and 54. The switching system 52 serves as end office for a plurality of customer or subscriber stations such as the telephones 54 and 58 and computer 60. These customer stations or terminals are connected to the central office switching system by local loops. In a similar manner the central office switching system 54 serves telephone terminals 64 and 66 and computer or PC 68 via local loops 70.

The central office switching systems 52 and 54 are SSP equipped and connected to an advanced intelligent network or AIN as represented by STP 72. The ISCP 74 may be of the type described in more detail in connection with FIG. 2. The links between the STP, ISCP, and SSP equipped switching systems comprise packet switched data links carrying signaling system 7 (SS7) protocol signals. The intelligent peripheral 76 is connected to the SSP equipped switching system 54 by a voice and data link which may preferably comprise an ISDN link. The IP connected to the ISCP by a data link separate from the common channel signaling system which may use a signaling protocol such as TCP/IP, a generic data interface (GDI), or any of the other protocols previously discussed. The central office switching systems are connected by trunks 78 and tandem switches (not shown).

Figure 1:
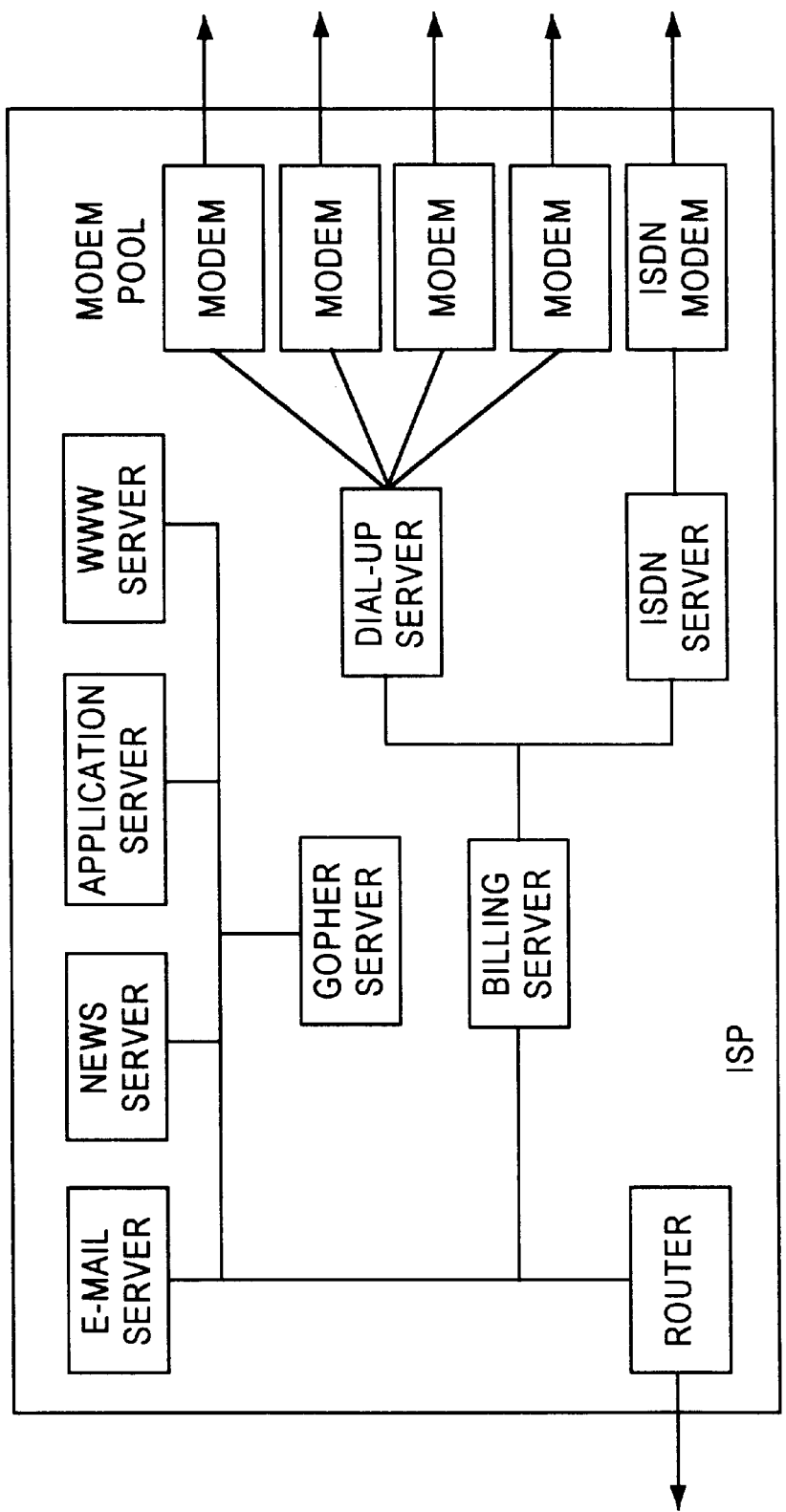
FIG. 1 shows a simplified block diagram of a typical architecture an Internet Service Provider (ISP) installation.

The Internet access plant of a public Internet service provider (ISP) 80 is connected to the central office switch 52 via a hunt group of lines 82. The ISP facility may be of the nature of that shown in FIG. 1 but is here simplified by showing only the representation of a modem pool 84, host or server 86, and router 88. The router 88 is connected to a gateway router (not shown) to connect to the Internet shown as a cloud 90.

A telephone company access hub 92 is connected to the central office switching system 54 by a plurality of lines which may include POTS or plain old telephone service connections as well as ISDN links shown collectively at 94. The telephone company (TELCO) hub may be of the type shown and described in detail in the common assignee's copending U.S. application Ser. No. 08/815,363, filed Mar. 11, 1997, and entitled Public IP Transport Network, which application is incorporated herein in its entirety by reference. The TELCO access hub is here shown in simplified fashion as comprising network access servers (NASs) 96 and 98, an Ethernet packet switch 100, and a gateway router 102. The gateway router is connected via a TELCO switched multi-megabit data service (SMDS) network to the Internet 90 via an Internet gateway router (not shown). The TELCO access hub is designed to provide access to the Internet and related IP data transport service for users or customers employing a wide variety of procedures and intranetwork protocols. The hub provides Internet access to widespread local areas served by a public switched telephone network. In the latter example a consumer access provider company or ISP may obtain access to TELCO customers virtually throughout the TELCO's operating region.

Customers may obtain the use of various types of ports on the TELCO platform such as, by way of example, analog 28.8 Kb/s service, ISDN service, dedicated ports for SMDS (switched multimegabyte data service), frame relay, T1, DDS or other available services. As a matter of convenience the hubs will be collocated with central office switching systems and oftentimes may be sited in the same building. Each hub and its equipment will be operated, maintained and provisioned by TELCO personnel.

The current availability of the TELCO SMDS service, makes feasible virtually immediate provision of service to large business customers capable of interfacing via SMDS. This facilitates limitation of the load or traffic on the gateway routers in the hubs inasmuch as the SMDS signals may be bypassed around the router.

A key component of TELCO provided Internet access for the region which it serves is the LATA hub. One such hub is provided for each LATA. In one TELCO example 19 such LATA hubs are utilized. Dedicated access is offered only from such LATA hubs and will support connectionless services such as frame relay or SMDS, which are currently tariffed fast packet services which are non-distance sensitive. Other presently tariffed services also will be available from these LATA hubs, such as DDS or T1, however these services involve point to point circuits which require additional hardware and are distance sensitive. The TELCO access system would allow Internet service provider customers such as UUNet, PSI, and the like, to provide service and seek additional users, while obtaining immediate transport from an alternate source.

The main module of equipment in the hub is the gateway router. The gateway router is connected via redundant links to the TELCO LATA SMDS network or "cloud" and thence to the Internet at large. The SMDS links may be 34 Mb/s or T1 links or any combination thereof or of similar links.

The Internet Protocol Routing Service (IPRS) provided by the hub provides for the collection, concentration and management of the customers traffic. IP Routing Service comprises network routers located at LATA hub sites that will collect the customer's (ISP's) end user traffic and concentrate it for connection and transport over a TELCO Exchange Access Switched Multi-Megabit Data Service (XASMDS) Subscriber Network Interface.

The operation of the system may be described as follows in reference to FIG. 4. A public Internet service provider or ISP 80 is increasing its customer base and experiencing circuit overload. By way of example, the overload is evidencing itself most adversely in the occurrence of an objectionably high number of busy signals to dial-up customers. The dial-up customers are within the region of the local exchange carrier (LEC) or TELCO operating the PSTN 50. The TELCO 50 offers a public IP transport service through various contract arrangements to utilize its AIN equipped network, IP access hub, and SMDS network for connection to the Internet.

The ISP arranges with the TELCO for the TELCO to provide for the ISP a specified number of lines to the TELCO's Internet access hub, along with hub capacity which is adequate to provide virtually delay free connection to the Internet. The arrangement between the two companies may constitute a continuous lease of lines and access hub capacity by the ISP, or alternatively, may constitute a guarantee of adequate capacity to handle specified overload. As part of the arrangement the TELCO will make available to the ISP an AIN/ISCP/IP monitoring and control functionality to provide transfer of load under conditions specified by the ISP.

On the basis of past measurements and data compilation by both the ISP and TELCO there is available a large amount of empirical data on the relationship of overload to various factors. This data shows that overload is related to predictable phenomena such as time of day, day of week, holiday occurrence, and the like. Such phenomena may be regarded as "static", in that they are predictable with relative certitude. The empirical data also shows that overload is additionally related to unpredictable events, such as local and national newsworthy conditions, catastrophes, crimes, financial events, sporting events, and the like.

By agreement the TELCO provides originating triggers in its end offices actuatable by the dialing of the directory numbers used by the ISP to access its dial-up hunt groups. When the ISP number is dialed by a caller, the originating trigger is actuated, the call is suspended, and the triggered end office launches a TCAP query to the ISCP. The ISCP is thus notified of each call to the ISP. Pursuant to agreement with the ISP, the ISCP and/or an associated IP collects, compiles, and stores the following information:

1. Record and date and time stamp each instance of unavailability of each specified ISP dial-up number (all lines in hunt group busy).
2. Record date and time of connection of each calling party.
3. Record date and time of disconnection for each line in the hunt group.
4. Compile record of rate of calls to the ISP number, date, and time.
5. Compile record of average duration of calls, date, and time.

6. Compile record of average time between disconnection and connection for each line in the hunt group, date, and time.
7. Compile record of rate of unavailability of dial-up number.
8. Maintain record of calls in progress and percentage of available hunt group lines in use, date, and time.
9. Record "quick disconnects", i.e., connections to the dial-up number followed by a disconnection within a specified threshold time period.
10. Compile rate of quick disconnects, date, and time.
11. Record time of wait between first ring of the dial-up number and connection to that number, date, and time.
12. Compile record of average time of wait, date, and time.

The TELCO installs in storage or databases in the ISCP and in the IP, tables of parameters and processing programs which are provided or specified by the ISP. Such parameters may be set for some or all of the dial-up numbers used by the ISP and served by the TELCO in the region. The parameters are used to construct operating algorithms. The experience of operating with the algorithms permits specification of various thresholds designed to signal imminent overload and to trigger preventive action, such as line redirection. The parameters and thresholds may also be used to identify conditions for discontinuing the line redirection, based on a change in the subsequent values of the same or additional parameters. Discontinuance of redirection may be predicated on "discontinuance" thresholds supplied by the ISP. In a simple case the ISP may direct discontinuing the line redirection when the threshold which was originally exceeded is no longer being exceeded.

Figure 8:
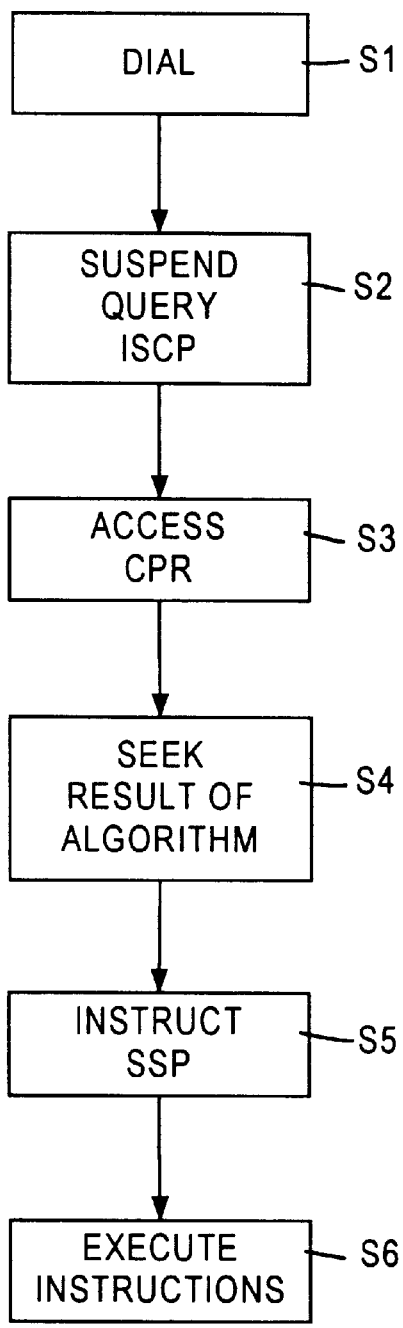
FIG. 8 shows a simplified flow chart illustrating the basic operation of one embodiment of the method of the invention.

FIG. 8 is a simplified flow diagram providing one example of the operation of the system described. FIG. 8 depicts the underlying method steps in the processing of a dial-up call to a directory number of an ISP having a line redirection arrangement with the TELCO offering IP transport.

The process begins at step S1 with an ISP subscriber dialing a directory number with which he/she has been provided to access the services of the ISP. This may constitute auto-dialing from the PC 60 connected to the end office 52 in FIG. 7. At step S2 the call by the subscriber actuates the originating trigger set in the SSP equipped end office 52 which serves the subscriber. This results in the SSP suspending service and initiating a TCAP inquiry message to the ISCP 74. This message includes, among other information, the called party number which identifies the ISP. On receiving the query the ISCP accesses the ISP customer profile record or CPR. This profile contains a record of the services to which the ISP is subscribed, along with indicating the processing which the ISP desires (step S3).

The customer profile record (CPR) is stored in the ISCP. The ISCP database also has maintained or collected therein the various items of information listed above. These include sufficient data relating to the ISP subscribed lines to permit the ISCP to "know" the condition of these lines at any given moment. In addition to this stored data there is also stored in the intelligent peripheral platform (IP) tables of parameter values and various threshold values. As presently discussed in further detail, this includes a parameter table which is continually receiving input from the ISCP as to the current parameter values. This also includes tables of current REDIRECT thresholds and current discontinue redirection values or conditions. These thresholds are subject to continual or periodic change. Such change may be based on a continuing recomputation of the various thresholds as time passes and additional data is collected. Thus the thresholds themselves are preferably dynamic in nature.

The main database of current parameter values and thresholds is preferably maintained in the IP. The IP comprises a robust computer system having the capacity to not only maintain the necessary databases but also to perform the desired algorithm computations to dynamically update the thresholds and continually perform the necessary computations to compare current parameter values to the dynamic thresholds and set flags to control the network action which is directed by the ISCP.

At step S4 the ISCP determines from ISP current command table in the IP the action to be taken with respect to the call in progress. The ISCP thereupon sends a TCAP response to the originating SSP end office at step S5. At step S6 the originating SSP executes the command. Such execution may comprise connecting the call to the ISP dial-up number, redirecting the call via an alternate route, or sending a busy signal to the caller. If the action taken comprises redirecting the call, this is undertaken in conjunction with action in the AIN as previously described.

Figure 9A:
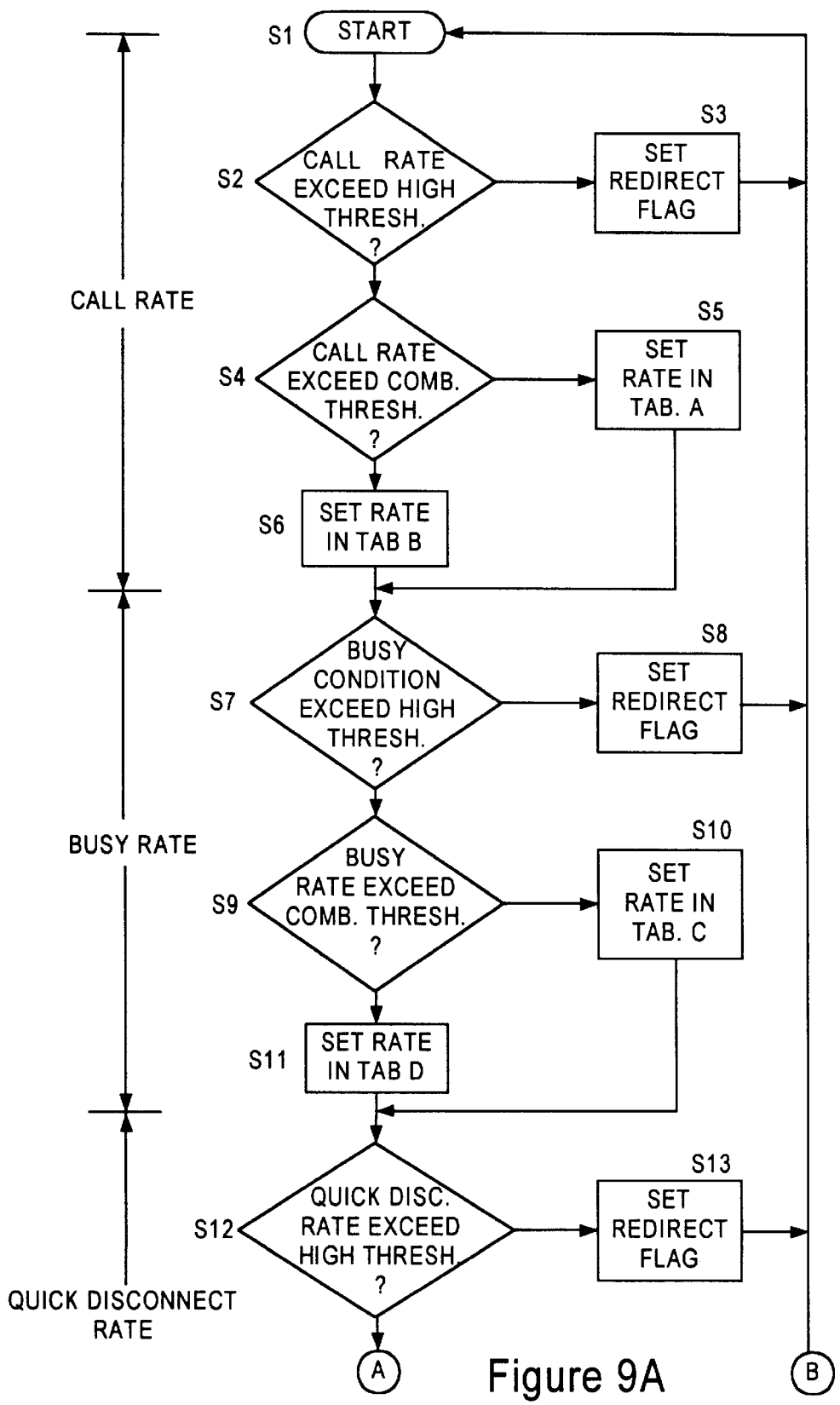
FIGS. 9A, 9B and 9C together form a simplified flow chart illustrating one embodiment of the use of illustrative dynamically set parameters and a typical algorithm for controlling operation of preferred embodiment of the invention.
Figure 9B:
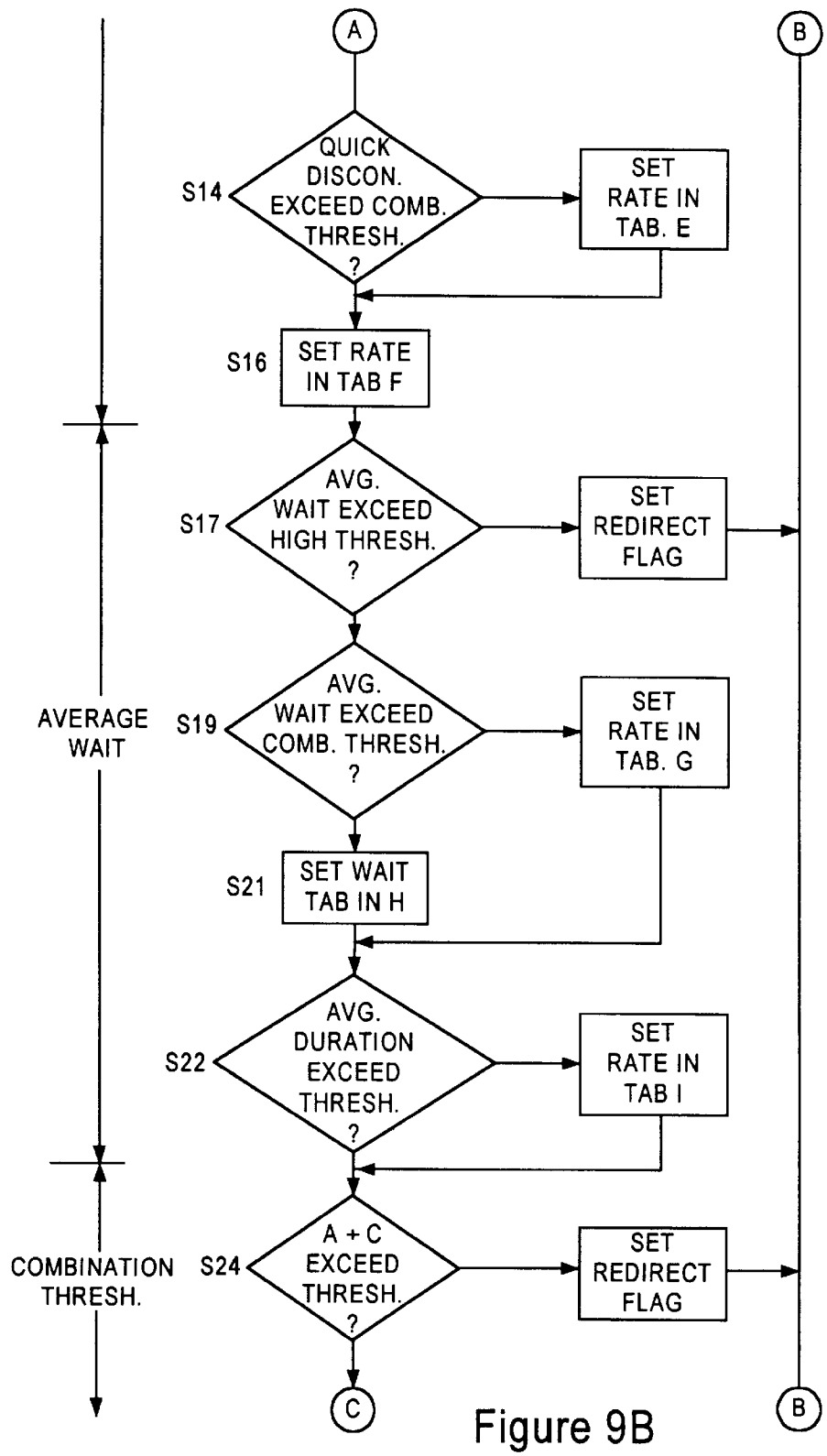
Figure 9C:
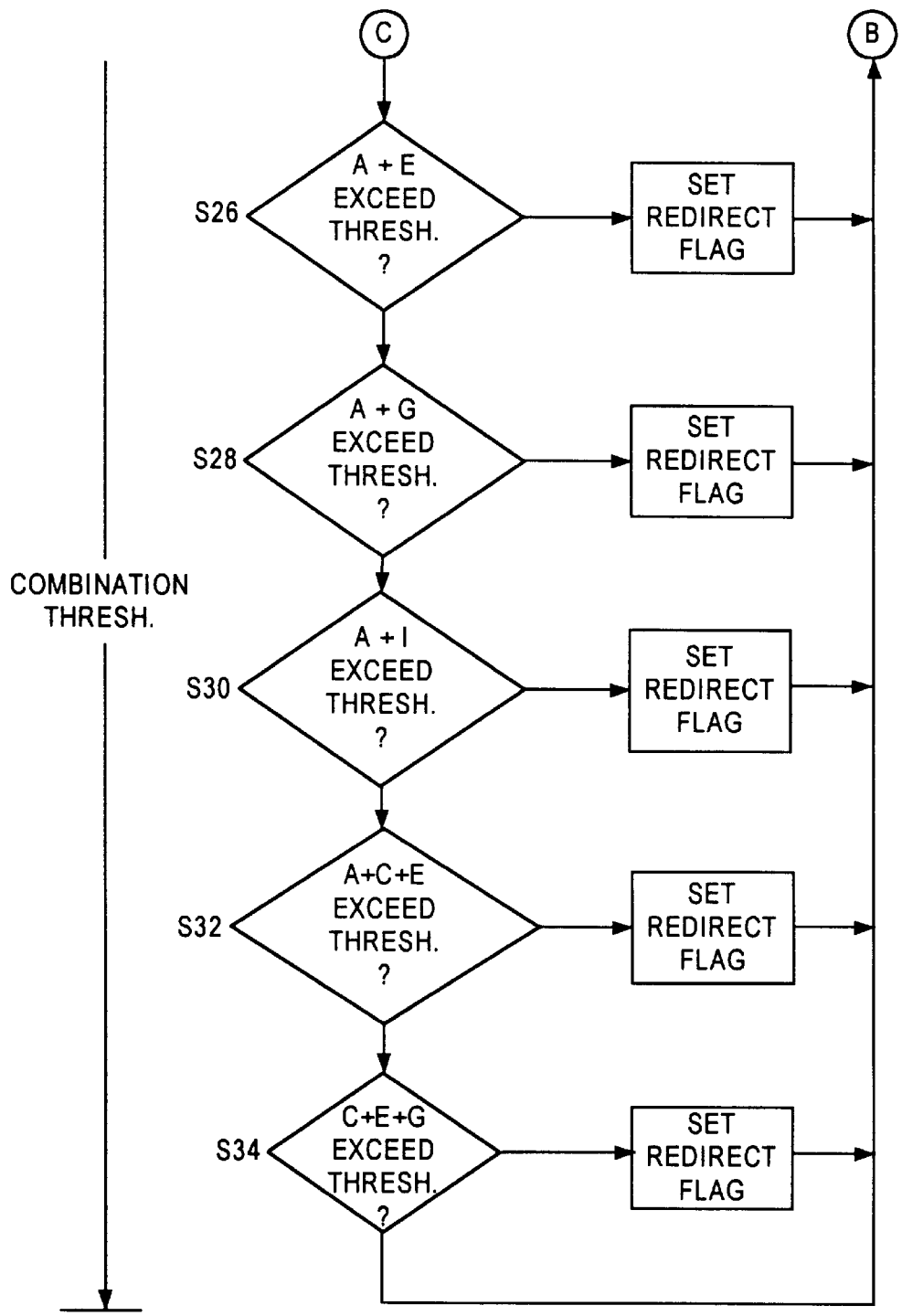

Referring to FIGS. 9A to 9C there is shown a simplified flow chart illustrating one example of typical operation pursuant to algorithms of the ISP with tables and data maintained therein. Such action is undertaken pursuant to the application programs which are provided by the ISP and run in the IP. As previously stated the general purpose IP shown in FIG. 5 is the preferred embodiment of IP.

The ISCP is continually compiling information as to ISP load parameters and populating the tables and/or databases of the ISP, which are preferably maintained in the IP. The IP in turn is continually performing ISP directed algorithms, which are now described by way of illustrative example. It will be understood that the example provided is by way of illustration only and is intended to show the wide flexibility of the system to account for and react to an almost unlimited number of parameters and combinations thereof. As a result of this continual dynamic surveillance, the action which is taken with respect to the call dialed to the ISP from the PC 60 is determined from conditions existing at the moment of that call.

Referring to the flow diagram in FIGS. 9A to 9C the process or algorithm is commenced at step S1 as indicated at START. The process branches at step S2 where it is determined whether the call rate to the ISP number equals or exceeds a first high threshold. This first high threshold is set at a value which the ISP knows from empirically gathered data and experience is in excess of the number of calls that can be handled by the hunt group which is connected to the particular ISP dial-up number. In order that this threshold not reflect a mere instantaneous spike in the rate, the rate is determined over a sufficiently long time period to eliminate abnormalities. If the current rate reflected by the tables equals or exceeds this threshold the process immediately moves to step S3 and sets a REDIRECTION flag in the ISP command table in the IP.

When the ISCP queries the ISP command table in the IP at step S4 in FIG. 5, and determines that the flag is set for redirection, the ISCP immediately transmits an appropriate command either to the originating SSP end office via the SS7 signaling network. Upon receipt of the signal the SSP originating end office switch redirects subsequent calls to the ISP number to an alternate route. In this example the alternate route is to the Internet Protocol or IP transport provided by the TELCO via its TELCO access hub 92 in FIG. 7. The ISP subscriber is then provided with the requested Internet access via this alternate route. Such redirection may occur either with or without the delivery of a voice prompt or execution of a computer text message to the ISP subscriber, at the option of the ISP. The redirection may be transparent to the caller. However, since the call is then handled via an alternate Internet access provider, the user interface and software is different and this is not transparent to the caller. Following the establishment of the redirected calls to the alternate route, the process proceeds from step S3 to loop back to the START and repeat. So long as the call rate exceeds the threshold the redirection will continue.

While this example entails alternate handling via Internet access facilities of the TELCO, it is also a feature of the invention that such alternate access could be supplied by a third party source, such as a competing ISP selected by the ISP which subscribes to the TELCO handling of the redirection. Such competing ISP may subscribe to all or a part of the total TELCO redirection service.

Returning to the decision branch at step S2 in FIG. 9A, if the call rate does not exceed the first or high threshold the process continues to the branch at step S4. At this point it is determined whether the current call rate, which is below the first or high threshold, is equal to or exceeds a second or "combination" threshold. This threshold is lower than the first threshold but is at a value which ISP empirical data shows may be of significance when combined with one or more other load parameters. If the current call rate equals or exceeds this second or combination call rate threshold, then the rate is recorded or updated in a rate tabulator here referred to as tabulator A. This is shown at step S5. While the entry of this value is described as being to a tabulator this is for purposes of convenience of description. The value is actually entered into database storage in the IP. Following the entry into the tabulator A at step S5 the process moves to step S7.

If the call rate at the determination at step S4 was below the second or combination rate, the call rate is recorded or updated at step S6 in another tabulator here referred to as tabulator B. It will be understood that this data storage is also entered into the storage of the IP. The process then proceeds to another determination or branch at step S7. At this point the next parameter, i.e., the busy condition rate, is examined. The determination at step S7 ascertains whether the current rate of busy conditions equals or exceeds a first or high busy condition threshold set by the ISP on the basis of its empirical information. If the rate exceeds this first or high busy rate condition threshold a REDIRECT flag is set in the ISP command tables at step S8.

When the ISCP reads the REDIRECT command at step S4 in FIG. 5, it immediately effects redirection by an appropriate message to the originating SSP end office as shown at step S5 in FIG. 5. Following the setting of the REDIRECT flag at step S8 the process loops back to START and repeats.

Returning to the decision branch at step S7 in FIG. 9A, if the busy rate does not exceed the first or high threshold the process continues to the branch at step S9. At this point it is determined whether the current busy condition rate, which is below the first or high threshold, is equal to or exceeds a second or "combination" threshold. This threshold is lower than the first threshold but is at a value which ISP empirical data shows may be of significance when combined with other load parameters. If the current busy condition rate equals or exceeds this second or combination busy condition rate, then the rate is recorded or updated in a rate tabulator here referred to as tabulator C. This is shown at step S10. Following the recording in tabulator C at step S10 the process proceeds to step S12.

If the determination at step S9 shows that the busy condition rate is below the second or combination rate, the rate is recorded or updated at step S11 in another tabulator here referred to as tabulator D. The process then proceeds to another determination or branch at step S12. A further parameter is now considered. Here it is determined whether the current average quick disconnect rate equals or exceeds a first high threshold set by the ISP on the basis of its empirical information. If the average quick disconnect rate exceeds this first or high threshold, a REDIRECT flag is set in the ISP command tables in the IP at step S13. From this point the process loops back to START and is repeated.

If the ISCP reads such a REDIRECT command at step S4 in FIG. 5, it immediately effects redirection by an appropriate message to the originating SSP end office as shown at step S5 in FIG. 5.

Returning to the decision branch at step S12 in FIG. 9A, if the average quick disconnect rate does not exceed the first or high threshold the process continues to the branch at step S14. At this point it is determined whether the current average quick disconnect rate, which is below the first or high threshold, is equal to or exceeds a second or "combination" threshold. This threshold is lower than the first threshold but is at a value which ISP empirical data shows may be of significance when combined with other load parameters. If the current average disconnect rate equals or exceeds this second or combination rate, then the rate is recorded or updated in a tabulator here referred to as tabulator E. This is shown at step S15. From step S15 the process proceeds to step S17.

If the average quick disconnect rate determination at step S14 is below the second or combination threshold, the average quick disconnect rate is recorded or updated at step S16 in another tabulator here referred to as tabulator F. The process then proceeds to another determination or branch at step S17.

A further parameter is now considered. Here it is determined whether the current average wait before connect equals or exceeds a first high threshold set by the ISP on the basis of its empirical information. If the average wait exceeds this first or high wait threshold, a REDIRECT flag is set in the ISP command tables in the IP at step S18. From this point the process loops back to START and is repeated.

If the ISCP reads such a REDIRECT command at step S4 in FIG. 5, it immediately effects redirection by an appropriate message to the originating SSP end office as shown at step S5 in FIG. 5.

Returning to the decision branch at step S17 in FIG. 9B, if the average wait does not exceed the first or high threshold the process continues to the branch at step S19. At this point it is determined whether the current average wait, which is below the first or high threshold, is equal to or exceeds a second or "combination" threshold. This threshold is lower than the first threshold but is at a value which ISP empirical data shows may be of significance when combined with other load parameters. If the current average wait equals or exceeds this second or combination rate, then the wait value is recorded or updated in a tabulator here referred to as tabulator G. This is shown at step S20. From step S15 the process proceeds to step S22.

If the average wait value determination at step S19 is below the second or combination threshold, the average wait is recorded or updated at step S21 in another tabulator here referred to as tabulator H. From here the process proceeds to step S22 where a further parameter is examined.

At step S22 it is determined whether or not the average duration of connected calls exceeds a threshold which has been set by the ISP. If the average duration of connected calls exceeds the set threshold, the value of the average duration is established or updated at step S23 in yet another tabulator, here referred to as tabulator I. The process then proceeds to the branch or determination at step S24.

At step S24 the first of a series of empirical algorithms is applied. Thus the current value of call rate in tabulator A is added to the current value of busy condition rate in tabulator C. If the total exceeds the set threshold, the REDIRECT flag is set in step S25. From here the process loops back to START and repeats.

If the ISCP reads such a command at step S4 in FIG. 5, it immediately effects redirection by an appropriate message to the originating SSP end office as shown at step S5 in FIG. 5. The process next proceeds to the determination at step S26.

At step S26 the second of a series of empirical algorithms is applied. Thus the current values of call rate in tabulator A is added to the current value of the average quick disconnect in tabulator E. If the total exceeds the set threshold, the REDIRECT flag is set in step S27. From here the process loops back to the START and repeats.

If the ISCP reads such a command at step S4 in FIG. 5, it immediately effects redirection by an appropriate message to the originating SSP end office as shown at step S5 in FIG. 5. The process next proceeds to the determination at step S28.

At step S28 the third of a series of empirical algorithms is applied. Thus the current values of busy condition rate in tabulator C is added to the current value of the average wait in tabulator G. If the total exceeds the set threshold, the REDIRECT flag is set in step S29. The process here loops back to the START and repeats.

If the ISCP reads such a command at step S4 in FIG. 5, it immediately effects redirection by an appropriate message to the originating SSP end office as shown at step S5 in FIG. 5. The process next proceeds to the determination at step S30.

At step S30 the fourth of a series of empirical algorithms is applied. Thus the current values of call rate in tabulator A is added to the current value of the average duration in tabulator I. If the total exceeds the set threshold, the REDIRECT flag is set in step S31. The process here loops back to the START and repeats.

If the ISCP reads such a command at step S4 in FIG. 5, it immediately effects redirection by an appropriate message to the originating SSP end office as shown at step S5 in FIG. 5. The process next proceeds to the determination at step S32.

At step S32 the fifth of a series of empirical algorithms is applied. Thus the current values of call rate in tabulator A is added to the busy condition rate in tabulator C and the sum is added to the current value of the average quick disconnect rate in tabulator E. If the total exceeds the set threshold, the REDIRECT flag is set in step S33.

If the ISCP reads such a command at step S4 in FIG. 5, it immediately effects redirection by an appropriate message to the originating SSP end office as shown at step S5 in FIG. 5. The process next proceeds to the determination at step S34.

At step S34 the sixth of a series of empirical algorithms is applied. Thus the current value of busy rate in tabulator C is added to the current value of quick disconnect rate in tabulator E and to the current value of the average wait in tabulator G. If the total exceeds the set threshold, the REDIRECT flag is set in step S35. At this point the process loops back to START and repeats.

If the ISCP reads a REDIRECT command at step S4 in FIG. 5, it immediately effects redirection by an appropriate message to the originating SSP end office as shown at step S5 in FIG. 5. The process then proceeds back to the START at step S1 and is repeated.

As previously described it is a feature of the invention that the AIN directed common channel interoffice signaling (CCIS) system used in the invention may provide redirection of calls on an individual basis without returning a busy signal to the caller. Thus the caller may be presented with the appearance of having uninterrupted and delay free dial-up access to the Internet through his or her ISP of choice. While common channel signaling can provide a determination of the availability of the called line in the conventional manner, the method of the invention makes originating office to destination office CCIS unnecessary for this purpose. The ISCP, through its monitoring of the circuits provided to the ISP, maintains a record of the condition and status of those lines on a continual basis. As a result, at the dialing of a call to the ISP, the ISCP is already aware of the availability or unavailability of the called line. As a result it may immediately signal the originating office of unavailability. On receipt of notification that the called line is unavailable, the originating end office would normally transmit a busy signal to the caller. However according to this feature of the invention the ISCP is notified of such unavailability. Upon receiving such notification, and depending upon the existence of any other parameters specified by the ISP customer, the ISCP may order call forwarding so that the call is completed via alternate facilities in a manner transparent to the caller.

Also as previously described, the invention provides not only an alternate route to the Internet but also an Internet access to the server of the subscriber's dialed ISP.

The invention offers to Internet access providers instant access to overload paths on a dynamic basis. The methodology offers wide flexibility in the manner of forecasting overload conditions and instant response to predictive criteria to prevent their occurrence. The criteria is susceptible of adaptation to varying network conditions on a dynamic basis It will be noted that the overall algorithm illustrated in FIGS. 9A to 9C collected data not actually used in the multiple algorithms represented in steps S24–S34. This additional data is useable in additional sub-algorithms at the option of the ISP. The collection of the data is here shown in order that the wide flexibility of the method may be appreciated.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A wide area communication system comprising:
   a switched telecommunication network including trunked together program controlled switching systems coupled to user terminals and providing dial-up connection between selective user terminals;
   a control signaling network separate from said trunked network and including a controller coupled to said switching systems and having data storage associated therewith;

a packet switched internetwork of spaced computer networks;

a first internetwork service provider having an interface with said internetwork; said service provider interface being connected to a first of said switching systems via a dial-up telecommunication link capable of providing simultaneous dial-up connection of said interface to multiple terminals connected to a second of said switching systems to provide to said multiple terminals simultaneous access to said internetwork;

a second internetwork service provider having an interface with said internetwork; said second service provider interface being connected to one of said switching systems in said telecommunication network;

said controller monitoring dial-up calls to said telecommunication link to detect predetermined conditions related to dial-up calls placed by said multiple terminals;

said data storage having stored therein data representing said predetermined conditions;

said controller transmitting control signals to effect the redirection of dial-up calls placed to said telecommunication link from said link to said second service provider interface via said one of said switching systems.

2. A communication system according to claim 1 wherein said dial-up telecommunication link comprises multiple lines between said first of said switching systems and said first service provider interface; said lines being connected to said first of said switching systems to be connectable to a calling party dialing a single number.

3. A communication system according to claim 2 wherein said multiple lines comprise a hunt-group.

4. A communication system according to claim 1 wherein said internetwork comprises the Internet.

5. A communication system according to claim 1 wherein said first service provider interface comprises a group of modems coupled to said telecommunication link, a router coupled to said internetwork, and a server coupling said modems to said router.

6. A communication system according to claim 1 wherein said second service provider interface comprises a router coupled to said internetwork, and a server device coupled to said one of said switching systems.

7. A communication system according to claim 1 wherein said first service provider interface comprises a group of modems coupled to said telecommunication link, a router coupled to said internetwork, and a server coupling said modems to said router, and said second service provider interface comprises a router coupled to said internetwork, and a server device coupled to said one of said switching systems.

8. A communication system according to claim 7 wherein said router in said second service provider interface is coupled to said internetwork via a switched multi-megabit data service.

9. A communication system according to claim 1 wherein said controller comprises a service control point and said switching systems have service switching point capabilities, and said service control point is connected to said switching systems via a packet data switched network.

10. A communication system according to claim 9 wherein said service switching point is connected to said switching systems through at least one service transfer point.

11. A communication system according to claim 10 including an intelligent peripheral platform connected to said service control point via a data link separate from said signaling network, and is connected to at least one of said switching systems having service switching point capability.

12. A communication system according to claim 11 wherein said intelligent peripheral platform includes a processor and storage having stored therein data relating to said predetermined conditions, said processor running an application program comparing current conditions in said telecommunication link to said data stored therein to determine when said controller transmits said control signals to effect said redirection of dial-up calls.

13. A wide area communication system comprising:

a switched telecommunication network including trunked together program controlled switching systems having service switching point capabilities coupled to user terminals by communication links and providing dial-up connection between selective user terminals;

a control signaling network separate from said trunked network and including a controller coupled to said switching systems via a packet switched data network and at least one service transfer point and having data storage associated therewith;

a packet switched internetwork of spaced computer networks;

a first internetwork service provider having an interface with said internetwork; said service provider interface being connected to a first of said switching systems via a dial-up one of said communication links capable of providing simultaneous dial-up connection of said interface to multiple terminals connected to a second of said switching systems to provide to said multiple terminals simultaneous access to said internetwork;

said first service provider interface comprising a group of modems coupled to said one of said communication links, a router coupled to said internetwork, and a server coupling said modems to said router;

a second internetwork service provider having an interface with said internetwork; said second service provider interface being connected to one of said switching systems in said switched telecommunications network;

said second service provider interface comprising a router coupled to said internetwork, and a server device coupled to said one of said switching systems;

said controller monitoring dial-up calls to said one of said communication links to detect predetermined conditions related to dial-up calls to said one of said communication links placed by said multiple terminals;

said data storage having stored therein data representing said predetermined conditions;

said controller transmitting control signals to effect the redirection of dial-up calls placed to said one of said communication links from said link to said second service provider interface via said one of said switching systems; and an intelligent peripheral platform connected to said service control point via a data link separate from said packet signaling network, and connected to at least one of said switching systems having service switching point capability via a voice and data link;

said intelligent peripheral platform including a processor and storage having stored therein data relating to said predetermined conditions, said processor running an application program comparing at least one of the conditions monitored by said controller to said data stored in said storage in said peripheral platform to determine when said controller transmits said control signals to effect said redirection of dial-up calls.

14. A communication system according to claim 13 wherein said application program scans multiple conditions monitored by said controller and compares said conditions to thresholds stored in said storage in said peripheral platform;

said control signal to effect said redirection of dial-up calls being transmitted when at least one of said conditions equals or exceeds a corresponding threshold.

15. A communication system according to claim 14 wherein one of said conditions is the rate of calls placed to said one of said communication links.

16. A communication system according to claim 14 wherein one of said conditions is the rate of busy conditions encountered by calls placed to said one of said communication links.

17. A method of providing dial-up access to an internetwork of computer networks via a telecommunications network to provide to terminals connected to said telecommunications network a dial-up connection to said internetwork via an internetwork service provider connected to said internetwork via an interface device, said method comprising the steps of:

establishing traffic parameters for a first internetwork service provider connection to said telecommunications network for connection to said terminals which dial-up said first internetwork service provider connection to said telecommunications network;

monitoring said first internetwork service provider connection to said telecommunications network and determining the current value of said parameters;

comparing the determined current values of said parameters resulting from said monitoring to said established values; and redirecting at least certain of said calls from said first internetwork service provider connection to said telecommunications network to a second internetwork service provider connected to said switched telecommunications network when said determined current values of said parameters resulting from said monitoring bear a predetermined relationship to at least one of said established traffic parameters.

18. A method according to claim 17 wherein said monitoring is on a substantially continuous basis.

19. A method according to claim 18 wherein said comparing is on a substantially continuous basis.

20. A method according to claim 17 wherein said switched telecommunications network includes a separate control network and a controller, wherein said monitoring is controlled by said controller.

21. A method according to claim 20 wherein control network comprises a common channel signaling system and said controller comprises a service control point.

22. A method according to claim 20 wherein said service control point includes data storage and said current determined values of said parameters are stored in said storage for comparison to said established traffic parameters.

23. A method according to claim 22 wherein at least one of said parameters is a computed parameter based on a combination of at least two of said monitored parameters.

24. A method according to claim 23 wherein said computation of said computed parameter is performed by a device other than said service control point.

25. A method according to claim 24 wherein said computation is performed by a device associated with a peripheral platform coupled to said service control point and also coupled to a switching system in said switched telecommunication network.

26. A method according to claim 17 including the step of establishing for a redirected call a connection through said internetwork from said second internetwork service provider to said interface of said first internetwork service provider.

27. In a wide area hybrid network comprising:

a switched telecommunication network having switching systems coupled to user terminals and providing dial-up connection between selective user terminals;

a control signaling network separate from said switched network and including a controller coupled to said switching systems and having data storage associated therewith;

a packet switched internetwork of spaced computer networks;

a first internetwork service provider having an interface with said internetwork; said service provider interface being connected to a first of said switching systems via a dial-up telecommunication link capable of providing simultaneous dial-up connection of said interface to multiple terminals connected to a second of said switching systems to provide to said multiple terminals simultaneous access to said internetwork;

a second internetwork service provider having an interface with said internetwork; said second service provider interface being connected to one of said switching systems in said telecommunications network;

a method comprising the steps of:

storing in said data storage data representing predetermined parameters related to dial-up calls placed by said multiple terminals to said dial-up telecommunication link;

monitoring in said controller predetermined criteria related to dial-up calls to said telecommunication link;

transmitting from said controller control signals effecting the redirection of dial-up calls placed to said telecommunication link from said link to said second service provider interface via said one of said switching systems upon detecting from said criteria the occurrence of one or more of said parameters.

28. A method according to claim 27 including the step of computing one of said stored parameters from criteria derived from prior monitoring.

29. A method according to claim 27 wherein one of said criteria is the rate of calls placed to said telecommunications link.

30. A method according to claim 27 wherein one of said criteria is the rate of unavailability of said telecommunications link to calls placed thereto.

* * * * *